UNITED STATES PATENT OFFICE.

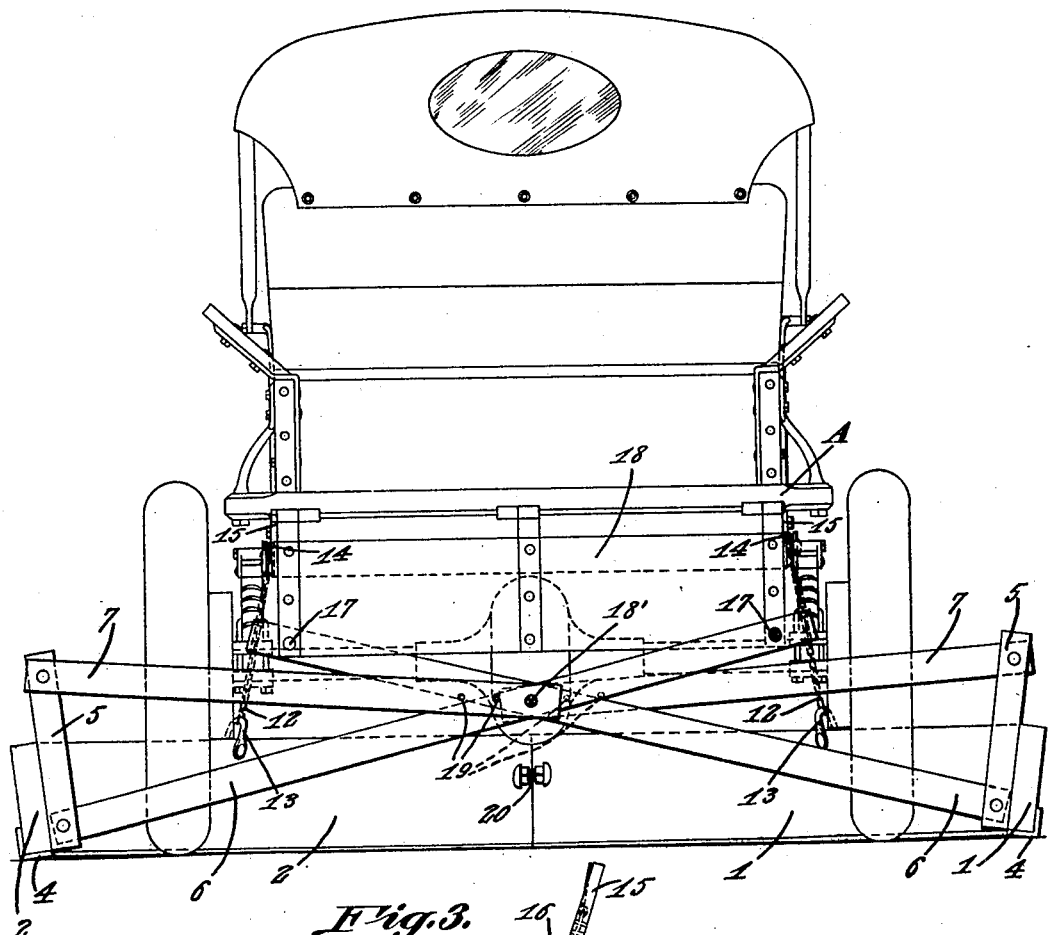

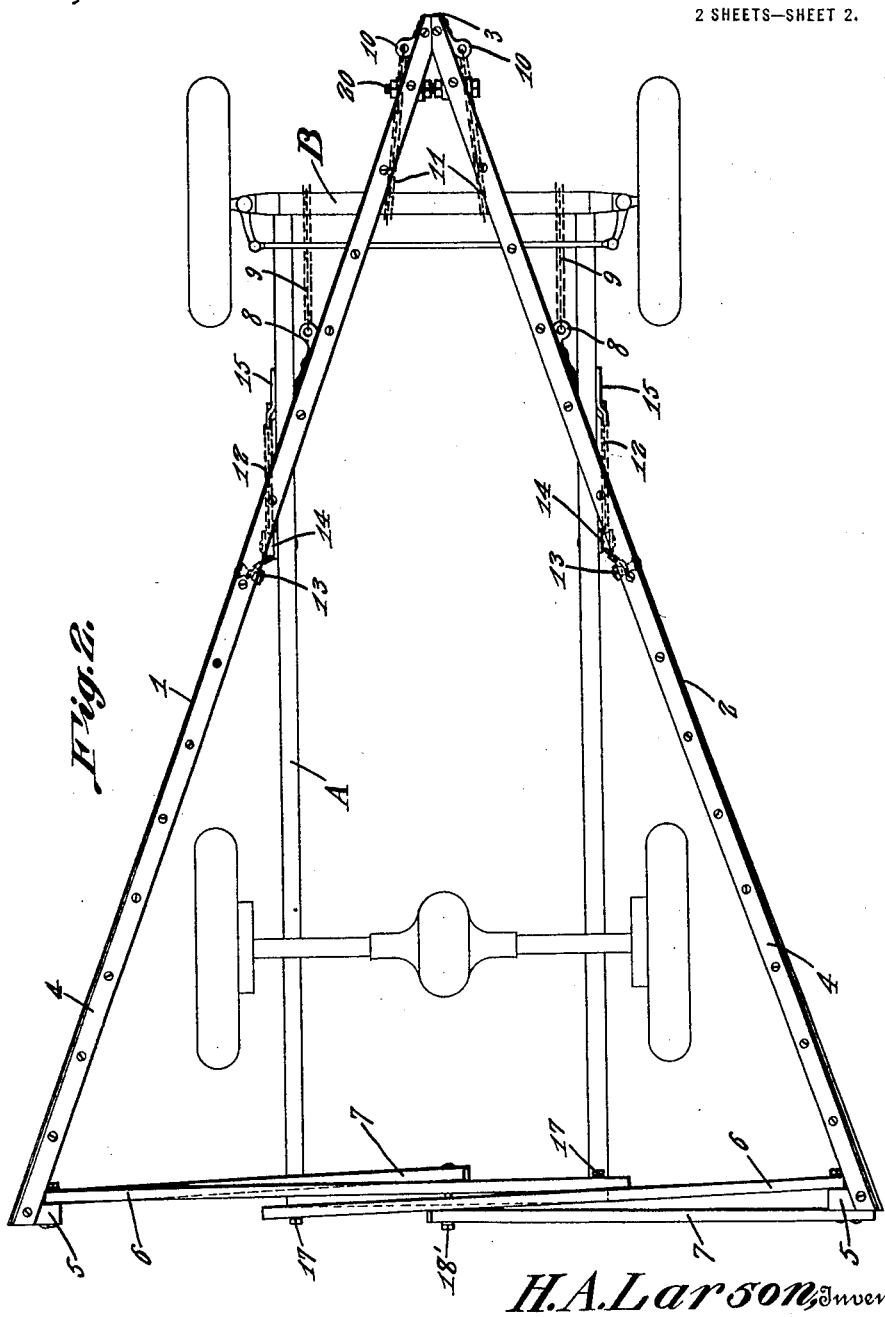

HARRY A. LARSON, OF MILFORD, UTAH.

ROAD-DRAG.

1,401,614. Specification of Letters Patent. Patented Dec. 27, 1921.

Application filed August 25, 1920. Serial No. 405,870.

*To all whom it may concern:*

Be it known that I, HARRY A. LARSON, a citizen of the United States, residing at Milford, in the county of Beaver and State of Utah, have invented a new and useful Road-Drag, of which the following is a specification.

This invention relates to a road drag, one of the objects being to provide a structure of this character particularly designed for use in connection with an ordinary motor truck.

A further object is to provide a drag which is held in proper position on the road by the weight of the truck to which it is attached, can be connected readily to a truck, and can be easily raised and lowered as desired either to entirely clear the ground, or to effect light dragging.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In accompanying drawings the preferred form has been shown.

In said drawings:

Figure 1 is a rear elevation of a truck having the drag attached thereto;

Fig. 2 is a bottom plan view of a truck with the drag in position;

Fig. 3 is a view more or less in diagram showing in side elevation, a means for lifting the drag relative to the truck.

Referring to the figures by characters of reference 1 and 2 designate forwardly converging scrapers fastened together at their front ends, as shown at 3 and provided, along their lower edges, with wear strips 4. Standards 5 are secured to the rear end portions of the scrapers and pivotally connected to the lower ends of the standards are upwardly extending crossed attaching strips 6. Brace strips 7 are pivotally connected to the upper ends of the standards.

Brackets 8 are attached to the scrapers 1 and 2 near the front ends thereof and have draw chains 9 attached to them. Additional brackets 10 are secured to the front ends of the scrapers and are provided with pull back chains 11. Lifting chains 12 are connected to the upper edge portions of the scrapers by U-shaped links 13 which straddle and are pivotally connected to the scrapers and these lifting chains extend over supporting sheaves 14 to levers 15 which can be connected to the sides of the truck and are preferably provided with racks 16 for holding them in any position to which they may be adjusted.

A truck to which the drag can be attached has been indicated at A. This truck is adapted to be placed with the scrapers 1 and 2 passing between the front and back wheels and with the apex of the scraper between the front wheels. The pull back chains 11 are fastened to the front axle B of the truck and the draw chains 9 are extended forwardly and also connected to said front axle B. The levers 15 are connected to the sides of the truck and the strips 6 are crossed and fastened at their upper ends by bolts 17 or the like to the tail board 18 of the truck which is left in a downwardly hanging position. A bolt 18' is extending through the strips 6 at their point of crossing and is used for attaching said strips to the braces 7. These braces are provided with series of apertures 19 whereby they can be shifted longitudinally so as to hold the scrapers 1 and 2 at any desired angle relative to the surface of the ground. The front ends of the scrapers are held together by a cross bolt 20 which can be loosened to any extent necessary in order to permit the adjustment of the scrapers to the desired angle.

It will be apparent that when the truck is driven forward it will carry the drag therewith, the chains 9 pulling on the scrapers and the strips 6 and 7 holding the scrapers in proper relation to the truck. Should the truck be backed the chains 11 would pull upon the drag.

By providing an attachment of this kind which can be connected to a truck, the said attachment will be held in its proper course of movement because it cannot be shifted laterally without dragging the truck therewith. Furthermore by operating the levers 15 the drag can be raised any distance desired either to produce a light dragging action or to lift the drag entirely out of contact with the ground.

What is claimed is:

1. A drag attachment for trucks including connected forwardly converging scrapers, crossed means extending upwardly and inwardly from the rear ends of the scrapers for attachment to the tail board of a truck, braces connected to the rear portions of the scrapers and extending toward each other, means for connecting said means and the braces together, draw chains extending from the scrapers and pull back chains attached to the front end portions of the scrapers.

2. A drag attachment for trucks including forwardly converging scrapers, standards attached to the rear ends of the scrapers, crossed attaching strips extending upwardly and inwardly from the lower ends of the standards and pivotally connected thereto, inwardly extending braces pivotally connected to the upper ends of the standards, means for fastening the crossed attaching strips together and to the tail board of a truck, said braces being adjustably held by said means, and flexible means for connecting the scrapers to the front axle of the truck.

3. A drag attachment for trucks including forwardly converging scrapers, means for connecting the scrapers to the front axle of a truck to move the scrapers with the truck during the forward and backward movement thereof, attaching strips pivotally connected to the rear portions of the scrapers, a fastening bolt extending through said strips for securing them to the tail board of a truck, said strips being crossed at the point of attachment, and inwardly extending braces connected to the scrapers and held by said fastening means, said braces being adjustably secured to the strips at their point of crossing.

4. The combination with a truck, of a drag including forwardly converging scrapers extending between the front and back wheels, flexible means connected to the scrapers at points in front and back of the front axle of the truck and connected to said axle for moving the scrapers with the truck during the forward and backward movement thereof, crossed attaching strips connected to the rear portions of the scrapers, means for fastening said strips at their point of crossing to the tail board of the truck, braces connected to the back portions of the scrapers and to said fastening means, and means carried by the truck for raising and lowering the scrapers relative to the truck.

In testimony that I claim the foregoing as my own, I have hereto affixed my signature in the presence of two witnesses.

HARRY A. LARSON.

Witnesses:
ANTON JOHNSON,
C. O. LARSON.